(12) United States Patent
Chuang et al.

(10) Patent No.: US 9,288,392 B2
(45) Date of Patent: Mar. 15, 2016

(54) IMAGE CAPTURING DEVICE CAPABLE OF BLENDING IMAGES AND IMAGE PROCESSING METHOD FOR BLENDING IMAGES THEREOF

(71) Applicant: Altek Semiconductor Corp., Hsinchu (TW)

(72) Inventors: Che-Lun Chuang, Hsinchu (TW); Hong-Long Chou, Taipei (TW)

(73) Assignee: Altek Semiconductor Corp., Hsinchu (TW)

( * ) Notice: Subject to any disclaimer, the term of this patent is extended or adjusted under 35 U.S.C. 154(b) by 236 days.

(21) Appl. No.: 13/961,897

(22) Filed: Aug. 8, 2013

(65) Prior Publication Data

US 2014/0218550 A1 Aug. 7, 2014

(30) Foreign Application Priority Data

Feb. 6, 2013 (TW) .............................. 102104649 A
Jun. 26, 2013 (TW) .............................. 102122757 A

(51) Int. Cl.
*G06K 9/32* (2006.01)
*H04N 5/232* (2006.01)

(52) U.S. Cl.
CPC ....... *H04N 5/23248* (2013.01); *H04N 5/23229* (2013.01)

(58) Field of Classification Search
None
See application file for complete search history.

(56) References Cited

U.S. PATENT DOCUMENTS

| 2006/0221209 A1* | 10/2006 | McGuire et al. | 348/239 |
| 2009/0207313 A1* | 8/2009 | Bellers | 348/699 |
| 2012/0188394 A1* | 7/2012 | Park et al. | 348/222.1 |
| 2013/0335596 A1* | 12/2013 | Demandolx et al. | 348/231.99 |

* cited by examiner

*Primary Examiner* — Andrew Moyer
(74) *Attorney, Agent, or Firm* — Jianq Chyun IP Office

(57) ABSTRACT

An image capturing device and an image processing method are provided. The present method includes following steps. A first image and a second image are captured with a first focal length and a second focal length correspondingly. The motion corrected second image is produced by performing geometric correction procedure on the second image. A gradient operation is performed on each of the pixels of the first image to obtain a plurality of first gradients, and the gradient operation is performed on each of the pixels of the motion corrected second image to obtain a plurality of second gradients. The first gradients and the second gradients are compared and a first parameter map is generated according to the comparison results. A blending image is produced in according with the first parameter map and the first image, and an output image is produced at least in according with the blending image.

14 Claims, 8 Drawing Sheets

IMAGE CAPTURING DEVICE CAPABLE OF BLENDING IMAGES AND IMAGE PROCESSING METHOD FOR BLENDING IMAGES THEREOF

CROSS-REFERENCE TO RELATED APPLICATION

This application claims the priority benefit of Taiwan application serial no. 102104649, filed on Feb. 6, 2013, and Taiwan application serial no. 102122757, filed on Jun. 26, 2013. The entirety of each of the above-mentioned patent application is hereby incorporated by reference herein and made a part of this specification.

BACKGROUND

1. Technical Field

The invention relates to an image capturing device and an image processing method thereof. Particularly, the invention relates to an image processing method capable of blending images by calculating pixel gradients.

2. Related Art

Along with development of optical technology, digital cameras capable of adjusting aperture, shutter and even changing lenses are widely used, and functions of the digital camera tend to be diversified. Besides that the digital camera is required to provide good imaging quality, accuracy and speed of a focusing technique are also factors considered by a consumer when the consumer purchases the digital camera. However, regarding an existing optical system, since different objects have different distances in a three-dimensional scene, an entirely clear full depth of field (DOF) image cannot be obtained in a single image capturing process. Namely, limited by a lens optical characteristic, when the digital camera is used to capture image, only one of depths is selected for focusing, so that objects of other depths in the image are less clear.

A conventional method of producing a full DOF image is to combine a plurality of images captured according to different capturing conditions. Different images of one scene are captured by changing one or a plurality of parameters in the capturing condition, and these images are combined into one clear image according to a clarity determination method. The technique of capturing images according to the above different capturing conditions to produce the full DOF image relies on a fixed image capturing device. Generally, a user usually uses a stable tripod to fix the image capturing device, so as to ensure that the captured images have none obvious geometric distortion there between. Moreover, during the image capturing process, movement of any object in the scene to be captured has to be avoided as well.

On the other hand, when the camera is used to capture images, in order to highlight a theme of the captured image, an image capturing technique of "bokeh" is generally adopted. The so-called "bokeh" refers to that in a captured image with a shallow DOF, the part of image outside the DOF gradually produces a loose blur effect. Generally, a bokeh effect produced by the camera lens is limited. In order to obtain a better bokeh effect, important conditions of large aperture and long focal length have to be satisfied. In other words, in order to achieve a better bokeh effect, a large aperture lens is used to strengthen blur of distant objects, so as to highlight the clear theme from the background. However, the large aperture lens has a large volume and high cost, which is not suitable for the general consumable cameras.

Therefore, the conventional method for producing the full DOF image or the dokeh image is liable to cause a problem that the processed image has a discontinuous DOF or unnatural result. Moreover, limitation on the image capturing operation is inconvenient to the user, for example, a long average total image capturing time or a complicated operating process, which even leads to an unsatisfactory final image.

SUMMARY

Accordingly, the invention is directed to an image capturing device and an image processing method thereof, by which a main object of an image is determined according to images captured with different focal lengths, so as to generate an image with a clear main object and a natural bokeh effect. On the other hand, in the image processing method, a ghost phenomenon occurred when generating a full depth of field (DOF) image is avoided according to the images captured with different focal lengths.

The invention provides an image processing method, which is adapted to an image capturing device. The image processing method includes following steps. A first image and a second image are captured with a first focal length and a second focal length, where the first focal length is focused on at least one main object. A geometric calibration procedure is performed on the second image to produce the motion calibrated second image. A gradient operation is performed on each pixel of the first image to produce a plurality of first gradients, and the gradient operation is performed on each pixel of the motion calibrated second image to produce a plurality of second gradients. Each of the first gradients and the corresponding second gradient are compared to generate a plurality of first pixel comparison results, and a first parameter map is generated according to the first pixel comparison results. A blending image is produced according to the first parameter map and the first image, and an output image is produced at least in accordance with the blending image.

In an embodiment of the invention, the step of producing the output image at least in accordance with the blending image includes following steps. A third image is captured with a third focal length. The geometric calibration procedure is performed on the third image to produce the motion calibrated third image. The gradient operation is performed on each pixel of the blending image to generate a plurality of third gradients, and the gradient operation is performed on each pixel of the motion calibrated third image to generate a plurality of fourth gradients. Each of the third gradients and the corresponding fourth gradient are compared to generate a plurality of second pixel comparison results, and a second parameter map is generated according to the second pixel comparison results. The motion calibrated third image and the blending image are blended according to the second parameter map to produce the output image.

In an embodiment of the invention, the step of performing the geometric calibration procedure on the second image to produce the motion calibrated second image includes following steps. A motion amount estimation is performed on the first image and the second image to calculate a homography matrix. A geometric affine transformation is performed on the second image according to the homography matrix, so as to obtain the motion calibrated second image.

In an embodiment of the invention, the step of comparing the each of the first gradients and the corresponding second gradient to generate the first pixel comparison results, and generating the first parameter map according to the first pixel comparison results includes following steps. The second gradients are divided by the corresponding first gradients to generate a plurality of gradient comparison values. A plurality of parameters are generated according to the gradient comparison values, and the parameters are recorded as the parameter map.

In an embodiment of the invention, the step of generating the parameters according to the gradient comparison values includes following steps. It is determined whether the gradient comparison values are greater than a first gradient threshold. The parameters corresponding to the gradient comparison values are set to a first value when the gradient comparison values are greater than the first gradient threshold.

In an embodiment of the invention, the step of generating the parameters according to the gradient comparison values includes following steps. It is determined whether the gradient comparison values are greater than a second gradient threshold when the gradient comparison values are not greater than the first gradient threshold. The parameters corresponding to the gradient comparison values are set to a second value when the gradient comparison values are greater than the second gradient threshold. The parameters corresponding to the gradient comparison values are set to a third value when the gradient comparison values are not greater than the second gradient threshold, where the first gradient threshold is greater than the second gradient threshold.

In an embodiment of the invention, the step of producing the blending image according to the first parameter map and the first image includes following steps. A blur procedure is performed on the first image to generate a blur image. The first image and the blur image are blended according to the first parameter map to produce a main object clear image.

In an embodiment of the invention, the step of blending the first image and the blur image according to the first parameter map to produce the main object clear image includes following steps. It is determined whether the parameters are greater than a first blending threshold. Pixels of the blur image corresponding to the parameters are obtained to serve as pixels of the main object clear image when the parameters are greater than the first blending threshold. It is determined whether the parameters are greater than a second blending threshold when the parameters are not greater than the first blending threshold. Pixels of the main object clear image are calculated according to the parameters when the parameters are greater than the second blending threshold. Pixels of the first image corresponding to the parameters are obtained to serve as pixels of the main object clear image when the parameters are not greater than the second blending threshold, where the first blending threshold is greater than the second blending threshold.

In an embodiment of the invention, the step of producing the blending image according to the first parameter map and the first image includes following steps. A plurality of sums of absolute differences corresponding to each pixel is calculated according to a pixel value of each of the pixels in the first image and the second image, and the parameters in the first parameter map are adjusted according to the sums of absolute differences. The first image and the motion calibrated second image are blended according to the adjusted first parameter map to generate a full depth of field image.

In an embodiment of the invention, the step of calculating the sums of absolute differences corresponding to each pixel according to the pixel value of each of the pixels in the first image and the second image and adjusting the parameters in the first parameter map according to the sums of absolute differences includes following steps. A weighting factor of each of the parameters is determined according to the sums of absolute differences when the sums of absolute differences are greater than a motion threshold, and the parameters are adjusted according to the weighting factor, where each of the parameters decreases as the corresponding sum of absolute difference increases.

In an embodiment of the invention, the step of blending the first image and the motion calibrated second image according to the weighting factor-adjusted first parameter map to generate the full depth of field image includes following steps. It is determined whether the parameters are greater than a first blending threshold. Pixels of the motion calibrated second image corresponding to the parameters are obtained to serve as pixels of the full depth of field image when the parameters are greater than the first blending threshold. It is determined whether the parameters are greater than a second blending threshold when the parameters are not greater than the first blending threshold. Pixels of the full depth of field image are calculated according to the parameters when the parameters are greater than the second blending threshold. Pixels of the first image corresponding to the parameters are obtained to serve as pixels of the full depth of field image when the parameters are not greater than the second blending threshold, where the first blending threshold is greater than the second blending threshold.

According to another aspect, the invention provides an image capturing device including an image capturing module, a motion calibrating module, a gradient calculating module, a map generating module and an image blending module. The image capturing module captures a first image with a first focal length and captures a second image with a second focal length, where the first focal length is focused on at least one main object. The motion calibrating module performs a geometric calibration procedure on the second image to produce the motion calibrated second image. The gradient calculating module performs a gradient operation on each pixel of the first image to produce a plurality of first gradients, and performs the gradient operation on each pixel of the motion calibrated second image to produce a plurality of second gradients. The map generating module compares each of the first gradients and the corresponding second gradient to generate a plurality of first pixel comparison results, and generates a first parameter map according to the first pixel comparison results. The image blending module produces a blending image according to the first parameter map and the first image, and produces an output image at least in accordance with the blending image.

According to the above descriptions, based on a characteristic that different focal lengths lead to different images, a same scene is captured with different focal lengths, and gradient differences of each pixel between the images are compared to generate the parameter map. According to the information of the parameter map, a clear full depth of field image or a bokeh image with a clear main object and a blurry background is generated, so as to achieve a better full depth of field effect or a bokeh effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention provides a method for generating a bokeh image and a full depth of field (DOF) image according to a plurality of images captured with different focal lengths. At least one main object is focused and captured, and then the same scene is captured with another focal length. A parameter map is generated by comparing pixel gradients of the two images, and the main object in the image is accordingly determined, so as to produce an image with a bokeh effect. On the other hand, the parameter map used for image blending is generated by comparing pixel gradients of at least two images, so as to produce the full DOF image. In order to clearly describe the content of the invention, reference will now be made in detail to the present preferred embodiments of the invention.

Figure 1:
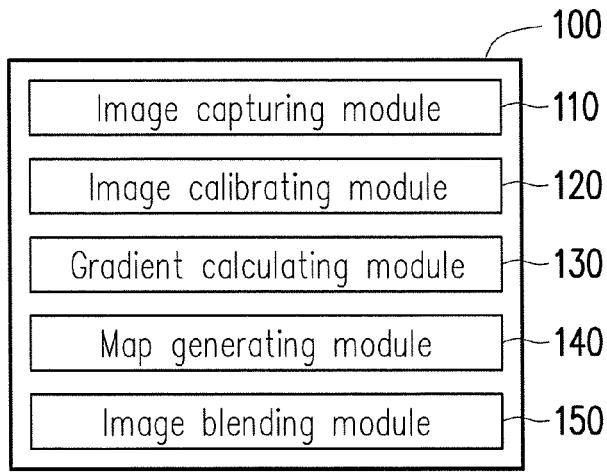
FIG. 1 is a functional block diagram of an image capturing device according to an embodiment of the invention.

FIG. 1 is a functional block diagram of an image capturing device according to an embodiment of the invention. Referring to FIG. 1, the image capturing device 100 of the present embodiment is, for example, a digital camera, a monocular camera, a digital video camera or a smart phone, a tablet PC, a head mounted display, etc. that have an image capturing function, though the invention is not limited thereto. The image capturing device 100 includes an image capturing module 110, an image calibrating module 120, a gradient calculating module 130, a map generating module 140 and an image blending module 150.

The image capturing module 110 includes a zoom lens and a photosensitive element, the photosensitive element is, for example, a charge coupled device (CCD), a complementary metal-oxide semiconductor (CMOS) or other device, the image capturing module 110 may further include an aperture, etc., which is not limited by the invention. The image capturing module 110 may capture different images with different focal lengths.

On the other hand, the image calibrating module 120, the gradient calculating module 130, the map generating module 140 and the image blending module 150 can be implemented by software, hardware or a combination thereof, which is not limited by the invention. The software is, for example, source codes, operating system, application software or driving program, etc. The hardware is, for example, a central processing unit (CPU), or other programmable general-purpose or special-purpose microprocessor.

Figure 2:
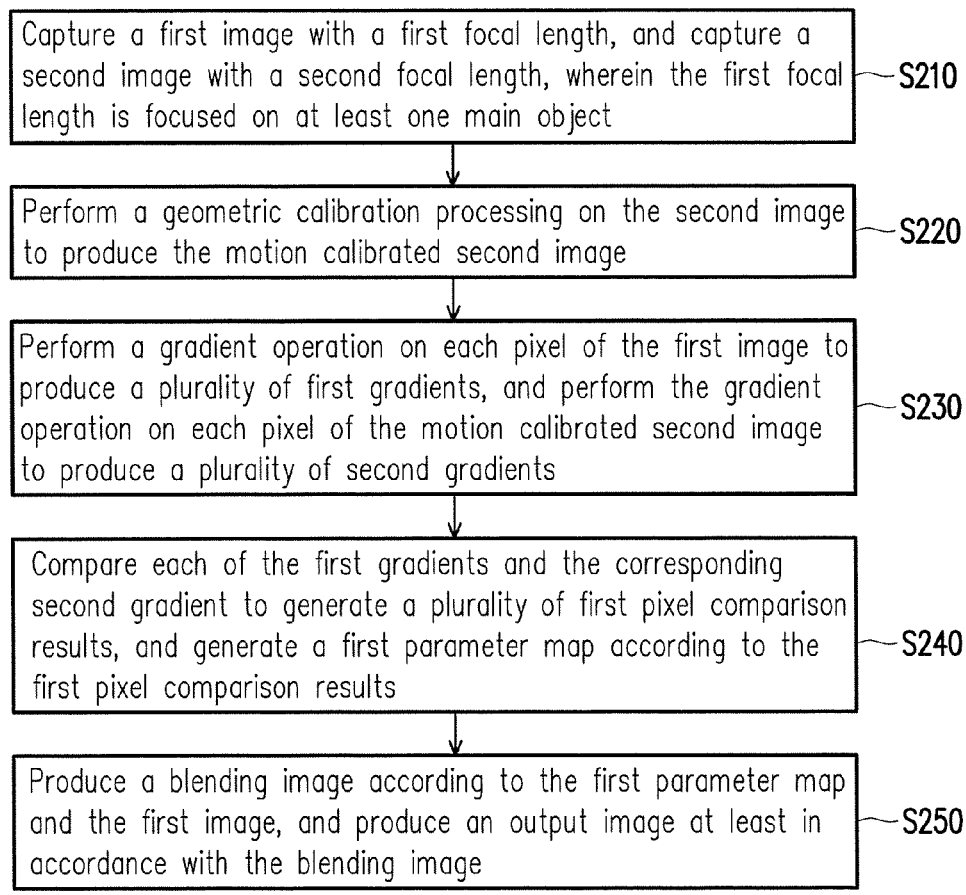
FIG. 2 is a flowchart illustrating an image processing method according to an embodiment of the invention.

FIG. 2 is a flowchart illustrating an image processing method according to an embodiment of the invention. The method of the present embodiment is adapted to the image processing device 100 of FIG. 1, detailed steps of the image processing method are described below with reference of various modules of the image capturing device 100.

First, in step S210, the image capturing module 110 captures a first image with a first focal length and captures a second image with a second focal length, where the first focal length is focused on at least one main object. Namely, the image capturing module 110 captures two images with two different focal lengths. Under a same condition, the images captured with different focal lengths are different. In detail, regarding the first image focusing on the main object, the main object in the image is the clearest part.

In step S220, the image calibrating module 120 performs a geometric calibration procedure on the second image to produce the motion calibrated second image. Since the first image and the second image are obtained by continuously capturing images of the same scene, images of different angles are probably captured due to shaking or moving of the camera, i.e. the first image and the second image may have a displacement. Therefore, the image calibrating module 120 performs the geometric calibration procedure on the second image. In other words, after the geometric calibration procedure, a position of a starting pixel of the motion calibrated second image can be the same to a position of a starting pixel of the first image.

In step S230, the gradient calculating module 130 performs a gradient operation on each pixel of the first image to produce a plurality of first gradients, and performs the gradient operation on each pixel of the motion calibrated second image to produce a plurality of second gradients. Namely, each pixel in the first image has the first gradient, and each pixel in the motion calibrated second image has the second gradient.

In step S240, the map generating module 140 compares each of the first gradients and the corresponding second gradient to generate a plurality of first pixel comparison results, and generates a first parameter map according to the first pixel comparison results. In brief, the map generating module 140 compares the gradients of the pixels located at the same position, and generates a pixel comparison result for each pixel position.

In step S250, the image blending module 150 produces a blending image according to the first parameter map and the first image, and produces an output image at least in accordance with the blending image. In detail, after obtaining the parameter map, the image capturing device 100 blends the first image and the image processed with other image processing according to the parameter map, so as produce the blending image. Moreover, the image capturing device 100 can also blend the first image and the second image according to the parameter map, so as to produce the blending image.

It should be noticed that although two images captured with two focal lengths are taken as an example for descriptions in the aforementioned embodiment, the invention is not limited thereto. According to an actual application, a plurality of images captured with a plurality of focal lengths can be obtained to produce the final output image. For example, since the images captured with different focal lengths respectively have different clear image parts, a clear full DOF image can be obtained according to the images captured with different focal lengths. Moreover, the image processing method of the invention can also produce an output image in which only the main object is clear according to three images respectively focused on the main object, the background and the foreground. An embodiment is provided below for detailed descriptions.

Figure 3:
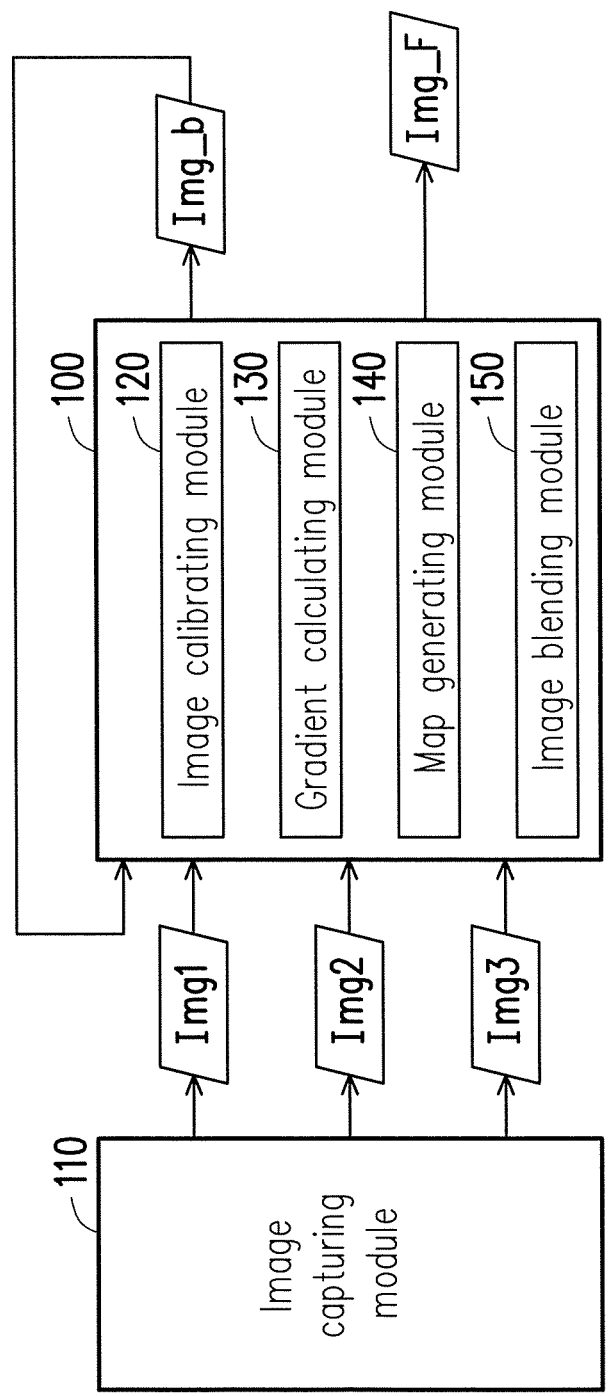
FIG. 3 is a schematic diagram of an image processing method according to another embodiment of the invention.

FIG. 3 is a schematic diagram of an image processing method according to another embodiment of the invention. In the present embodiment, the image capturing module 110 respectively captures a first image Img1 and a second image Img2 with a first focal length and a second focal length. Then, the same to the aforementioned embodiment, a blending image Img_b is generated based on processing of the image calibrating module 120, the gradient calculating module 130, the map generating module 140 and the image blending module 150, which is not repeated. It should be noticed that in the aforementioned embodiment, the image blending module 150 can take the blending image Img_b as the final output image, though in the present embodiment, the blending image Img_b is further blended with another image to produce a final output image Img_F. In detail, as that shown in FIG. 3, the image capturing module 110 captures a third image Img3 with a third focal length. The image calibrating module 120 performs the geometric calibration procedure on the third image Img3 to produce the motion calibrated third image Img3.

Thereafter, the gradient calculating module performs a gradient operation on each pixel of the blending image Img_b to generate a plurality of third gradients, and performs the gradient operation on each pixel of the motion calibrated third image Img3 to generate a plurality of fourth gradients. The map generating module 140 compares each of the third gradients and the corresponding fourth gradient to generate a plurality of second pixel comparison results, and generates a second parameter map according to the second pixel comparison results. The second parameter map is obtained by calculating gradients of the blending image Img_b and the third image Img3, and the internal parameters thereof are different to that of the first parameter map calculated according to the first image Img1 and the second image Img2. The image blending module 150 blends the motion calibrated third image Img3 and the blending image Img_b to produce the output image Img_f according to the second parameter map. Therefore, the number of images blended for obtaining the final output image is not limited by the invention, which is determined according to an actual application requirement.

However, implementation of the invention is not limited to the aforementioned description, and the content of the aforementioned embodiment can be varied according to an actual requirement. For example, in another embodiment of the invention, the image capturing device may further include an image blurring module to produce a main object clear image having the bokeh effect. Moreover, in still another embodiment of the invention, the image capturing device may further include a map adjusting module to produce a full DOF image having a better full DOF effect. Embodiments are provided below to describe how the gradient calculating module, the map generating module and the image blending module produce the bokeh image and the full DOF image according to images captured with different focal lengths.

Figure 4:
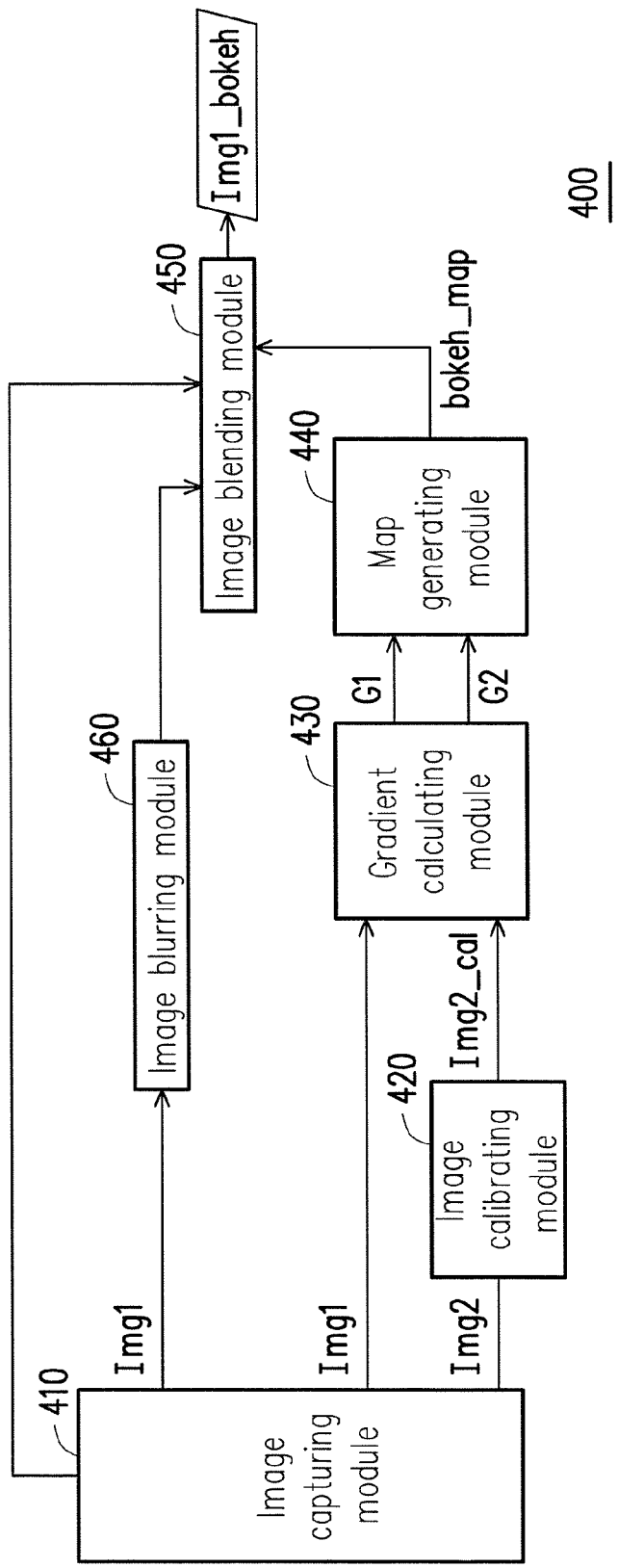
FIG. 4 is a block diagram of an image capturing device according to still another embodiment of the invention.

FIG. 4 is a block diagram of an image capturing device according to still another embodiment of the invention. The image capturing device 400 includes an image capturing module 410, an image calibrating module 420, a gradient calculating module 430, a map generating module 440, an image blending module 450 and an image blurring module 460. The image capturing module 410, the image calibrating module 420, the gradient calculating module 430, the map generating module 440 and the image blending module 450 are similar to the image capturing module 110, the image calibrating module 120, the gradient calculating module 130, the map generating module 140 and the image blending module 150 of FIG. 1, so that details thereof are not repeated. The embodiment of FIG. 4 can be deduced according to related descriptions of the embodiments of FIG. 1 to FIG. 3.

It should be noticed that different to the image capturing device 100 of FIG. 1, the image capturing device 400 further include an image blurring module 460. The image blurring module 460, for example, adopts a Gaussian filter, a bilateral filter or an average filter used for performing a blur procedure on the first image Img1, which is not limited by the invention. Moreover, in the present embodiment, it is assumed that the second focal length is focused on the background.

Figure 5:
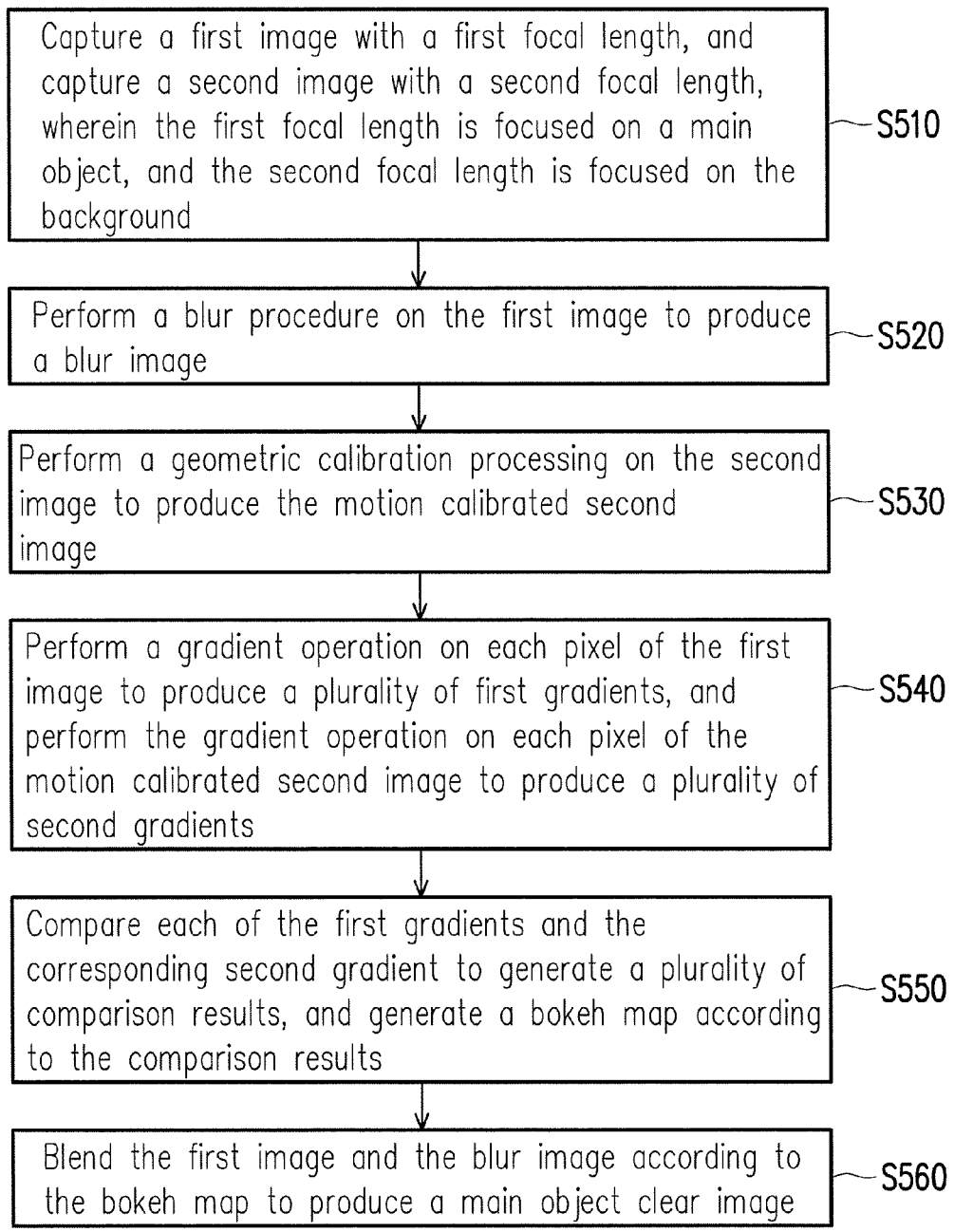
FIG. 5 is a flowchart illustrating an image processing method according to still another embodiment of the invention.

FIG. 5 is a flowchart illustrating an image processing method according to still another embodiment of the invention. The image processing method of the present embodiment is adapted to the image capturing device 400 of FIG. 4, and detailed steps of the present embodiment are described below with reference of various modules of the image processing device 400.

First, in step S510, the image capturing module 410 the image capturing module 410 respectively captures the first image Img1 with the first focal length and captures the second image Img2 with the second focal length, where the first focal length is focused on at least one main object, and the second focal length is focused on the background. In the first image Img1 captured by focusing on the main object, the main object is clear and the background is blurry. Compared to the first image Img1, in the second image Img2 captured by focusing on the background, the background is clear. Then, in step S520, the image blurring module 460 performs the blur procedure on the first image Img1 to produce a blur image Img1_blur.

In step S530, the image calibrating module 430 performs a geometric calibration processing on the second image Img2 to produce the motion calibrated second image Img2_cal. In detail, the image calibrating module 430 performs a motion amount estimation on the first image Img1 and the second image Img2 to calculate a homography matrix. Then, the image calibrating module 430 performs a geometric affine transformation on the second image Img2 according to the homography matrix, so as to obtain the transformed motion calibrated second image Img2_cal. In this way, a position of a starting pixel of a main object area in the first image Img1 can be the same to a position of a starting pixel of the main object area in the motion calibrated second image Img2_cal.

Then, in step S540, the gradient calculating module 440 performs a gradient operation on each pixel of the first image Img1 to produce a plurality of first gradients G1, and performs the gradient operation on each pixel of the motion calibrated second image Img2_cal to produce a plurality of second gradients G2. The gradient operation can be a horizontal gradient operation, a vertical gradient operation or dual diagonal gradient operations, which is not limited by the invention. Namely, the first gradient and the second gradient can be a horizontal gradient, a vertical gradient or dual diagonal gradients according to the method of the gradient operation. The horizontal gradient is a sum of absolute grayscale differences between the pixel and two adjacent pixels in the horizontal direction. The vertical gradient is a sum of absolute grayscale differences between the pixel and two adjacent pixels in the vertical direction. The diagonal gradient is a sum of absolute grayscale differences between the pixel and pixels in the diagonal direction.

It should be noticed that in the present embodiment, since the first image Img1 is captured by focusing on the main object, compared to the motion calibrated image Img2_cal, the main object in the first image Img1 is clearer. Namely, the gradient of the pixel in the main object area of the first image Img1 is greater than the gradient of the pixel located at the same position in the motion calibrated second image Img2_cal. Conversely, since the motion calibrated second image Img2_cal is captured by focusing on the background, the gradient of the pixel in the background area of the first image Img1 is smaller than the gradient of the pixel located at the same position in the motion calibrated second image Img2_cal.

Therefore, in step S550, the map generating module 440 compares each of the first gradients G1 and the corresponding second gradient G2 to generate a plurality of comparison results, and generates a parameter map according to the comparison results. It should be noticed that in the present embodiment, the parameter map is referred to as a bokeh map bokeh_map. In detail, the map generating module 440 compares the gradients of the pixels located at each same position in the first image Img1 and the motion calibrated second image Img2_cal. Then, based on the relationship between the gradients of each pixel in the first image Img1 and the motion calibrated second image Img2_cal, it is determined whether each pixel in the first image Img1 is located in the main object area or the background area according to a comparison result. The map generating module 440 generates the bokeh map bokeh_map according to the comparison result of the gradients of each pixel in the first image Img1 and the motion calibrated second image Img2_cal. In other words, the bokeh map bokeh_map carries comparison result information of the gradients of the pixels located at the same position in the first image Img1 and the motion calibrated second image Img2_cal.

Finally, in step S560, the image blending module 450 blends the first image Img1 and the blur image Img1_blur according to the bokeh map bokeh_map to produce a main object clear image Img1_bokeh. Therefore, the second image Img2 is used for producing the bokeh map bokeh_map, and the image blending module 450 blends the first image Img1 and the blur image Img1_blur according to the bokeh map bokeh_map to produce the main object clear image Img1_bokeh having the bokeh effect. In this way, the bokeh image with clear main object area and blurry background area is generated.

Figure 6:
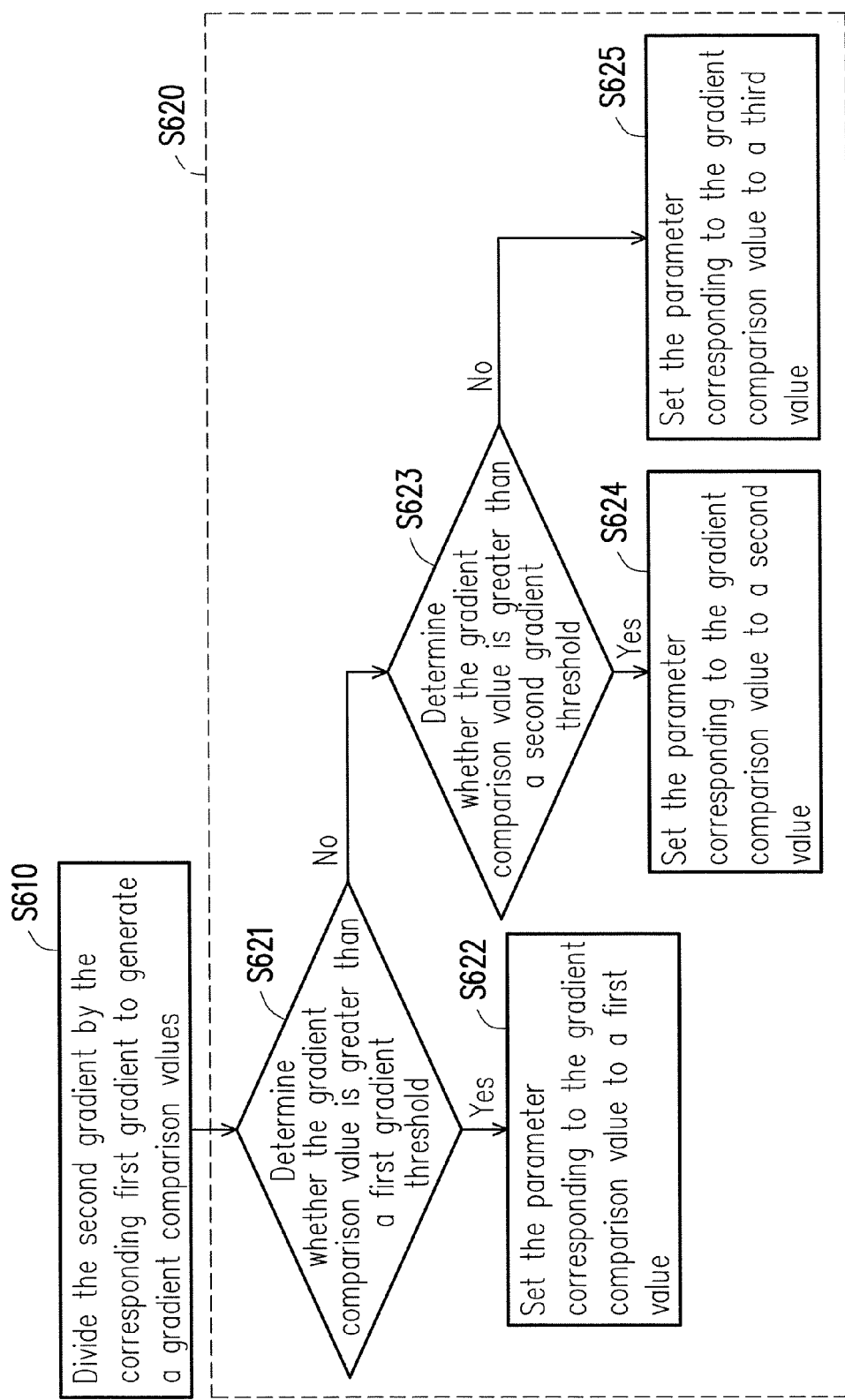
FIG. 6 is a flowchart illustrating detailed steps of a step S550 of FIG. 5 according to still another embodiment of the invention.

Moreover, how the map generating module 440 generates the bokeh map bokeh_map according to a comparison result of each of the first gradients G1 and the corresponding second gradient G2 is described in detail below. FIG. 6 is a flowchart illustrating detailed steps of the step S550 of FIG. 5 according to still another embodiment of the invention. Referring to FIG. 4 and FIG. 6, in step S610, the map generating module 440 divides the second gradients G2 by the corresponding first gradients G1 to generate a plurality of gradient comparison values. In step S620, the map generating module 440 generates a plurality of parameters according to the gradient comparison values, and records the parameters to the bokeh map bokeh_map. For example, if the first image Img1 and the motion calibrated second image Img2_cal respectively have 1024*768 pixels, 1024*768 gradient comparison values are generated through operation of the map generating module 440, and the bokeh map bokeh_map contains 1024*768 parameters. Here, the step S620 can be implemented by steps S621-S625.

The map generating module 440 determines whether the gradient comparison value of each position is greater than a first gradient threshold (step S621). If the gradient comparison value is greater than the first gradient threshold, the map generating module 440 sets the parameter corresponding to the gradient comparison value to a first value (step S622), and the first value is referred to as a bokeh background value. In other words, if the gradient comparison value is greater than the first gradient threshold, it represents that the pixel of such position is located in the background area. If the gradient comparison value is not greater than the first gradient threshold, the map generating module 440 determines whether the gradient comparison value is greater than a second gradient threshold (step S623). If the gradient comparison value is greater than the second gradient threshold, the map generating module 440 sets the parameter corresponding to the gradient comparison value to a second value (step S624), and the second value is referred to as a bokeh edge value. In brief, if the gradient comparison value is between the second gradient threshold and the first gradient threshold, it represents that the pixel of such position is located in an edge area connected between the main object area and the background area. If the gradient comparison value is not greater than the second gradient threshold, the map generating module 440 sets the parameter corresponding to the gradient comparison value to a third value (step S625), and the third value is referred to as a bokeh main object value, i.e. the pixel of such position is located in the main object area. It should be noticed that the bokeh edge value is between the bokeh background value and the bokeh main object value, and the first gradient threshold is greater than the second gradient threshold, and the first gradient threshold and the second gradient threshold are determined according to an actual requirement, which is not limited by the invention.

For example, it is assumed that the map generating module 440 sets the parameters to be between 0 and 255, the map generating module 440 can generate the bokeh map bokeh_map by using following pseudo code (1):

$$\text{if}\left(\frac{\text{Gra2}}{\text{Gra1}} > \text{TH1}\right) \quad (1)$$
$$\text{Map} = 255$$
$$\text{elseif}\left(\frac{\text{Gra2}}{\text{Gra1}} > \text{TH2}\right)$$
$$\text{Map} = \frac{\frac{\text{Gra2}}{\text{Gra1}} - \text{TH2}}{\text{TH1} - \text{TH2}} \times 255$$
$$\text{else}$$
$$\text{Map} = 0$$

In the present exemplary embodiment, the bokeh background value is 255, the bokeh main object value is 0, and the bokeh edge value can be calculated according to a ratio between the first gradient threshold and the second gradient threshold and a ratio between the second gradient and the first gradient. Gra2 is the second gradient, Gra1 is the first gradient, TH1 is the first gradient threshold, TH2 is the second gradient threshold, and Map is a plurality of parameters in the bokeh map bokeh_map.

Figure 7:
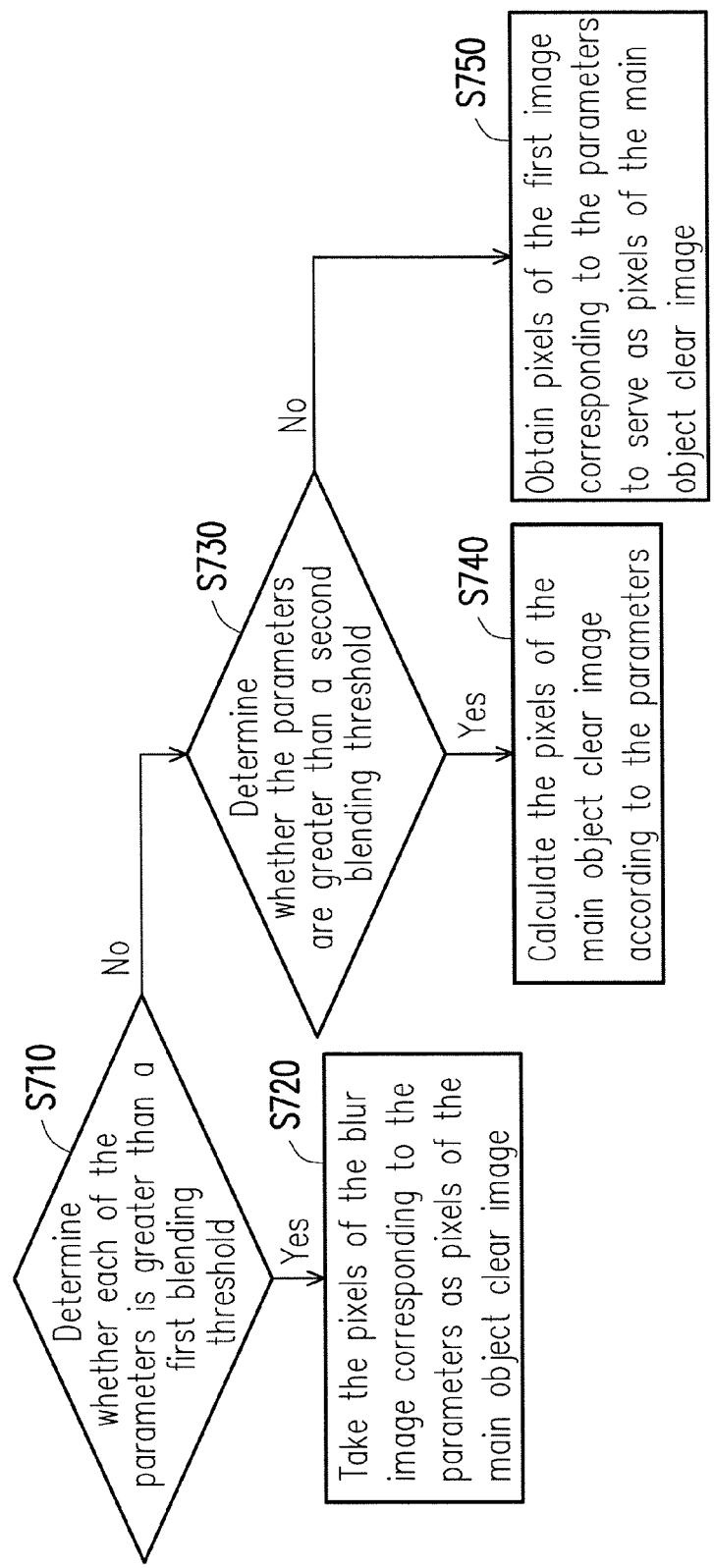
FIG. 7 is a flowchart illustrating detailed steps of a step S560 of FIG. 5 according to still another embodiment of the invention.

Moreover, it is described in detail below how the image blending module 450 generates the main object clear image Img1_bokeh by using the bokeh map bokeh_map. FIG. 7 is a flowchart illustrating detailed steps of the step S560 of FIG. 5 according to an exemplary embodiment of the invention. Referring to FIG. 4 and FIG. 7, it should be noticed that the pixel of each position in the first image Img1 may correspond to each of the parameters in the bokeh map bokeh_map. In step S710, the image blending module 450 determines whether each of the parameters is greater than a first blending threshold. If the parameters are greater than the first blending threshold, in step S720, the image blending module 450 takes the pixels of the blur image Img1_blur corresponding to the parameters as pixels of the same positions in the main object clear image Img1_bokeh, i.e. the pixels of theses positions are in the background area, so that the pixels of the blur image Img1_blur are obtained to produce the image with blurry background.

If the parameters are not greater than the first blending threshold, in step S730, the image blending module 450 determines whether the parameters are greater than a second blending threshold. If the parameters are greater than the second blending threshold, in step S740, the image blending module 450 calculates the pixels of the main object clear image Img1_bokeh corresponding to the parameters according to the parameters. In detail, the positions of the pixels corresponding to the parameters between the first blending threshold and the second blending threshold are determined to be located in the edge area connected between the background area and the main object area. The pixels in the edge area connected between the background area and the main object area in the main object clear image Img1_bokeh could be obtained by blending the first image Img1 and the blur image Img1_blur.

If the parameters are not greater than the second blending threshold, in step S750, the image blending module 450 obtains pixels of the first image Img1 corresponding to the parameters to serve as pixels of the main object clear image Imag1_bokeh. Namely, the positions corresponding to the parameters are determined to be within the main object area, so that the pixels in the main object area of the first image Img_1 are obtained to serve as the pixels in the main object area of the main object clear image Imag1_bokeh, where the first blending threshold is greater than the second blending threshold.

For example, it is assumed that the image blending module 450 sets the parameter to be between 0 and 255, the image blending module 450 can generate the main object clear image Imag1_bokeh by using following pseudo code (2):

if (Map ≥ Blend_TH1) //Background area  (2)
   Img1_Bokeh = Img1_Blur
else if (Map ≥ Blend_TH2) //Transition area
   $w_{Bokeh}$ = LUT[Map] (LUT is table and value range is 0~255)

$$\text{Img1\_Bokeh} = \frac{w_{Bokeh} \times \text{Img1} + (256 - w_{Bokeh}) \times \text{Img1\_Blur}}{256}$$

else //Subject
   Img1_Bokeh = Img1

In the present exemplary embodiment, Blend_TH1 is the first blending threshold, Blend_TH2 is the second blending threshold, Map is a plurality of parameters in the bokeh map bokeh_map, and LUT[ ] is a table lookup function. It should be noticed that the pixels in the edge area can be calculated according to a concept of weight. As that shown in the aforementioned exemplary pseudo code, the parameters are taken as a blending weight $W_{bokeh}$, and the pixels in the edge area are blended according to the blending weight $W_{bokeh}$. Namely, regarding a pixel in the edge area, a blur degree thereof is determined according to whether a position thereof is closer to the main object area or the blur area, and in this way, the main object clear image Img1_bokeh with naturally connected main object area and background area is produced, such that the edge between the main object and the background in the bokeh image can be soft and natural.

In the aforementioned embodiment, the second focal length is, for example, focused on the background, and a background blur image with a blurry background and clear main object is produced. According to the description of FIG. 3, it is known that the image processing method of the invention may obtain the final output image according to a plurality of images. In this way, in other embodiments, when the image capturing device captures another image with a third focal length focused on the foreground, the image capturing device can produce an image with blurry foreground and background and clear main object through calculation by using the aforementioned background blur image and the image captured by focusing on the foreground according to a process the same with that used for producing the background blur image.

Figure 8:
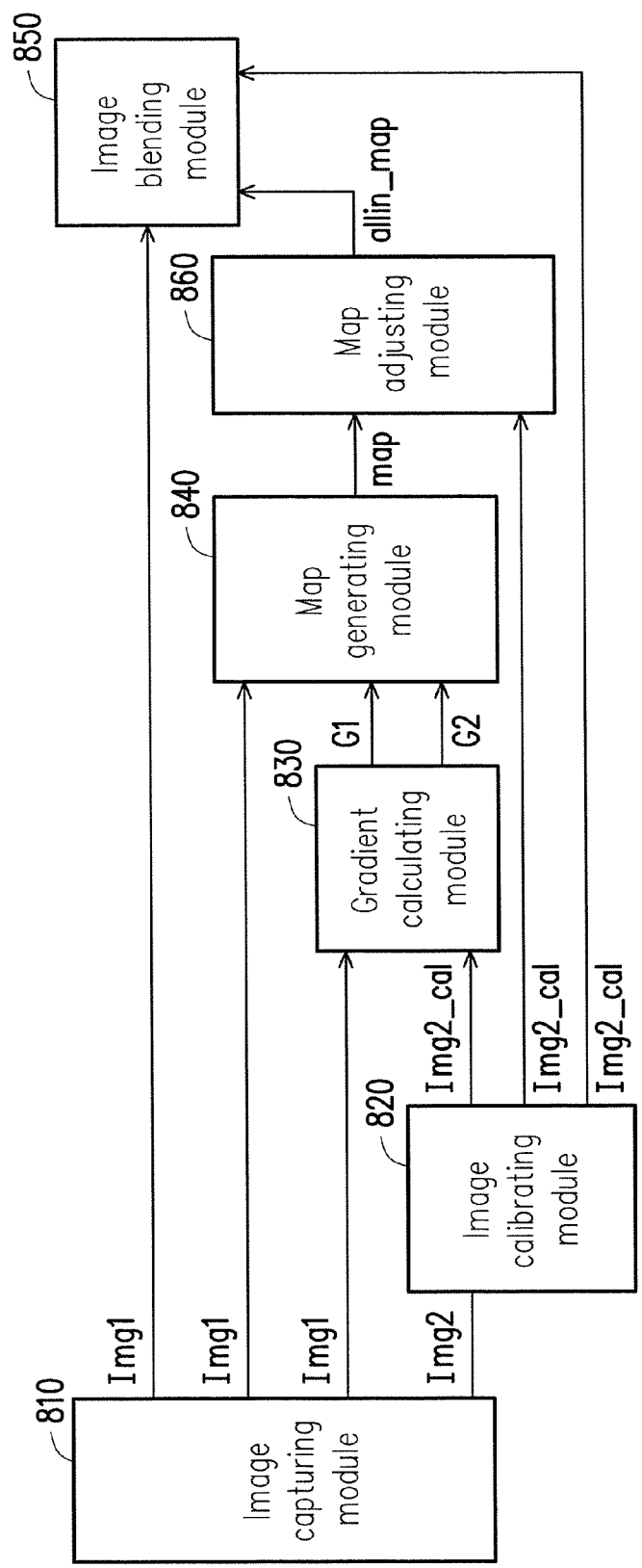
FIG. 8 is a block diagram of an image capturing device according to still another embodiment of the invention.

FIG. 8 is a block diagram of an image capturing device according to still another embodiment of the invention. Referring to FIG. 8, in the present embodiment, the image capturing device 800 is used for producing a full DOF image. The image capturing device 800 includes an image capturing module 810, an image calibrating module 820, a gradient calculating module 830, a map generating module 840, an image blending module 850 and a map adjusting module 860. The image capturing module 810, the image calibrating module 820, the gradient calculating module 830, the map generating module 840 and the image blending module 850 are similar to the image capturing module 410, the image calibrating module 420, the gradient calculating module 430, the map generating module 440 and the image blending module 450 of FIG. 4, so that details thereof are not repeated.

It should be noticed that different to the image capturing device 400 of FIG. 4, the image capturing device 800 of the present embodiment does not include the image blurring module but includes a map adjusting module 860. The map adjusting module 860 is used for adjusting the parameter map generated by the map generating module 840. In the present embodiment, the image capturing module 810 captures the first image Img1 with the first focal length, and captures the second image Img2 with the second focal length, where the first focal length is focused on at least one main object, and the second focal length is focused on an area outside the main object.

Then, the image calibrating module 830 performs the geometric calibration procedure on the second image Img2 to produce the motion calibrated second image Img2_cal. The gradient calculating module 830 performs a gradient operation on each pixel of the first image Img1 to produce a plurality of first gradients G1, and performs the gradient operation on each pixel of the motion calibrated second image Img2_cal to produce a plurality of second gradients G2. Then, the map generating module 840 compares each of the first gradients G1 and the corresponding second gradient G2 to generate a plurality of comparison results, and generates a parameter map according to the comparison results. The steps that the image calibrating module 820 generates the motion calibrated second image Img2_cal, the steps that the gradient calculating module 830 performs the gradient operation, and the steps that the map generating module 840 generates the parameter map are similar to that of the image capturing device 400 of FIG. 4, which can be deduced according to related descriptions of FIG. 4 and FIG. 5.

Generally, pixels located at a same position in two images have different gradients, i.e. the aforementioned first gradient G1 and the second gradient G2. On the other hand, regarding the pixel of the same position, if the pixel of such position has a higher gradient in the first image (i.e. G1 is greater than G2), it represents that the pixel of such position is located at a clearer area of the first image (i.e. an area within the first focal length). If the pixel of such position has a higher gradient in the second image (i.e. G2 is greater than G1), it represents that the pixel of such position is located at a clearer area of the second image (i.e. an area within the second focal length). Namely, the map generating module 840 can obtain the parameter map according to the pseudo code (1), though the invention is not limited thereto.

Therefore, in the present embodiment, the map generating module 440 generates the parameter map according to comparison results of the gradients of the pixels in the first image Img1 and the motion calibrated second image Img2_cal. In other words, the parameter map carries comparison result information of the gradients of the pixels located at the same position in the first image Img1 and the motion calibrated second image Img2_cal. In this way, the image capturing device 800 can learn whether a pixel of a certain position is located at a clear part within the first focal length in the first image Img1 or located at a clear part within the second focal length in the second image Imge2 according to the parameter map. In this way, the image blending module 850 can blend the clear parts of the two images for produce an output image with more clear parts.

It should be noticed that during a process that the user continuously shoots a same scene to capture the first image and the second image, due to a time difference on shooting, individual objects are probably moved in the scene. The image calibrating module 820 performs an overall motion calibration on the image (or camera motion), and does not calibrate individual objects in the scene, so that if the image has the moved individual objects, the blended full DOF image may have a ghost phenomenon. The map adjusting module 860 of the present embodiment is used for mitigating the aforementioned ghost phenomenon.

Therefore, the map adjusting module 860 calculates a plurality of sum of absolute differences corresponding to each pixel according to a pixel value of each of the pixels in the first image Img1 and the second image Img2, and adjusts the parameters in the parameter map according to the sums of absolute differences. The map adjusting module 860 blends the first image Img1 and the motion calibrated second image Img2_cal according to the adjusted parameter map to generate a full DOF image.

In detail, n×n pixel blocks (n is a positive integer) are first obtained from the first image Img1. It is assumed that n is 5, the obtained 5×5 pixel blocks are as that shown in FIG. 9A, which include 25 pixel positions $P_{00}$-$P_{44}$. Similarly, n×n pixel blocks that take the pixel positions as centers are obtained from the motion calibrated second image Img2_cal. Then, sums of absolute differences of specific color space components of each pixel in the n×n pixel blocks of the first image Img1 and the motion calibrated second image Img2_cal are calculated, and a representative maximum value thereof is found. The sums of absolute differences can reflect whether characteristics of the first image Img1 and the motion calibrated second image Img2_cal are close or not in the local area of the n×n pixel blocks. Under a YCbCr color space, the specific color space components include a luminance component, a blue chrominance component and a red chrominance component, though the color space is not limited by the invention. Under the YCbCr color space, it is assumed that n=5 and the sums of absolute differences SAD between the pixel positions in the first image Img1 and the motion calibrated second image Img2_cal are calculated according to following equations:

$$SAD\_Y = \sum_{i=0, j=0}^{i=4, j=4} |Y1_{ij} - Y2_{ij}|$$

$$SAD\_Cb = \sum_{i=0, j=0}^{i=4, j=4} |Cb1_{ij} - Cb2_{ij}|$$

$$SAD\_Cr = \sum_{i=0, j=0}^{i=4, j=4} |Cr1_{ij} - Cr2_{ij}|$$

$$SAD = \max(\max(SAD\_Y, SAD\_Cb), SAD\_Cr)$$

Figures 9A, 9B:
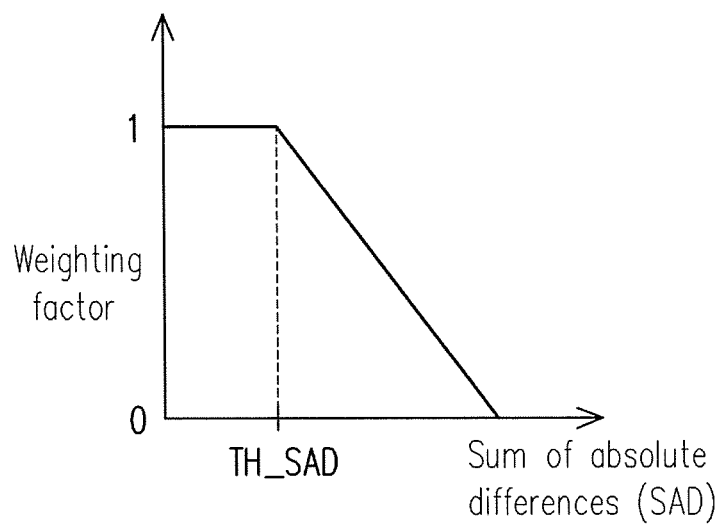
FIG. 9A is a schematic diagram of pixel blocks according to still another embodiment of the invention.
FIG. 9B is a schematic diagram illustrating a relationship between a sum of absolute differences and a weighting factor according to still another embodiment of the invention.

Where, i and j represent pixel positions, for example, in the example of FIG. 9A, each pixel block includes 25 pixel positions $P_{00}$-$P_{44}$. $Y1_{ij}$ is a luminance component of a pixel $P_{ij}$ in the first image, and $Y2_{ij}$ is a luminance component of the pixel $P_{ij}$ in the second image. $Cb1_{ij}$ is a blue chrominance component of the pixel $P_{ij}$ in the first image, and $Cb2_{ij}$ is a blue chrominance component of the pixel $P_{ij}$ in the second image. $Cr1_{ij}$ is a red chrominance component of the pixel $P_{ij}$ in the first image, and $Cr2_{ij}$ is a blue chrominance component of the pixel $P_{ij}$ in the second image. SAD_Y, SAD_Cb and SAD_Cr are sums of absolute differences on each specific color space component.

In this way, the map adjusting module 860 of the present embodiment, for example, obtain the sums of absolute differences SAD according to the aforementioned equations. Thereafter, the map adjusting module 860 determines whether the sums of absolute differences SAD are greater than a motion threshold TH_SAD. If the sums of absolute differences SAD are not greater than the motion threshold TH_SAD, it represents that the pixel block does not have a phenomenon of captured object movement, so that it is unnecessary to adjust the parameters in the parameter map corresponding to the pixel block. If the sums of absolute differences SAD are greater than the motion threshold TH_SAD, it represents that the pixel block has the phenomenon of captured object movement, and the map adjusting module 860 adjusts the parameters in the parameter map corresponding to the pixel block according to magnitudes of the sums of absolute differences SAD. For example, the map adjusting module 860 can generate an adjusted parameter map allin_map according to following pseudo code (3):

(3)
```
if (SAD > TH_SAD)
   Fac = LUT[SAD];
   allin_map = map × Fac
else
   allin_map = map
```

Where, Fac represents a weighting factor used by the map adjusting module 860 for adjusting the parameter map. Therefore, when the sums of absolute differences SAD are greater than the motion threshold TH_SAD, the map adjusting module 860 determines the weighting factor Fac of each parameter according to the sum of absolute differences SAD, and adjusts the parameter in the parameter map according to the weighting factor Fac. The weighting factor Fac decreases as the sum of absolute differences SAD increases.

FIG. 9B is a schematic diagram illustrating a relationship between the sum of absolute differences and the weighting factor according to still another embodiment of the invention. Referring to FIG. 9B, when the sum of absolute differences SAD is greater than the motion threshold TH_SAD, the map adjusting module 860 determines the weighting factor of each parameter according to the sum of absolute differences SAD, and adjusts the parameter according to the weighting factor. The weighting factor decreases as the sum of absolute differences SAD increases. Namely, each parameter decreases as the corresponding sum of absolute differences SAD increases.

Then, the image blending module 850 blends the first image Img1 and the motion calibrated second image Img2_cal according to the adjusted parameter map alline_map, so as to produce a full DOF image Img_AIF without the ghost phenomenon. The steps that the image blending module 850 generates the full DOF image according to the adjusted parameter map allin_map are similar to the steps that the image blending module 450 generates the bokeh image according to the bokeh map bokeh_map, and details thereof can be deduced according to related description of FIG. 7, which are not repeated. For example, the image blending module 850 may obtain the final full DOF image Img_AIF according to following pseudo code (4):

--- if (Map ≥ Blend_TH1) //In-of-focus area of image 2                       (4)
    Img1_AIF = Img2
else if (Map ≥ Blend_TH2) //Transition area
    $w_{AIF}$ = LUT[Map] (LUT is table and value range is 0~255)

$$Img1\_AIF = \frac{w_{AIF} \times Img1 + (256 - w_{AIF}) \times Img2}{256}$$

else //In-of-focus area of image 1
    Img1_AIF = Img1

---

Where, in the exemplary pseudo code (4), it is assumed that the parameters are between 0 and 255, Blend_TH1 is the first blending threshold, Blend_TH2 is the second blending threshold, Map is a plurality of parameters in the adjusted parameter map allin_map, and LUT[ ] is a table lookup function. It should be noticed that the pixels in the edge area can be calculated according to a concept of weight. As that shown in the aforementioned exemplary program codes, the parameters are taken as a blending weight $W_{AIF}$, and the pixels in the edge area are blended according to the blending weight $W_{AIF}$.

Similarly, according to related description of FIG. 3, it is known that the image processing method of the present embodiment can obtain the final output image according to a plurality of images. Therefore, in the present embodiment, the image capturing device 800 may capture a plurality of images with a plurality of different focal lengths, and blend the images captured with different focal lengths to produce a clear full DOF image. In an actual application, the scene is first analysed to determine the number of images of different focal lengths that are required for producing the entirely clear full DOF image.

In summary, according to the image capturing device and the image processing method of the invention, the parameter map is calculated by using at least two images of different focal lengths, and the main object clear image or the full DOF image is generated by blending according to the parameter map. According to the image processing method of the invention, one or more main objects can be clear and the background is blurry, so as to highlight the one or more main objects in the image. Besides, a connecting edge between the main object and the background in the image can be soft and natural, so as to obtain an image with good and natural bokeh effect. On the other hand, the images captured with different focal lengths can be used to construct an entirely clear full DOF image. Moreover, when the full DOF image is constructed, the noises in the image can also be eliminated, so as to ensure that the constructed full DOF image does not lose details of the image.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing method, adapted to an image capturing device, the image processing method comprising:
    capturing a first image with a first focal length, and capturing a second image with a second focal length, wherein the first focal length is focused on at least one main object;
    performing a geometric calibration procedure on the second image to produce the motion calibrated second image;
    performing a gradient operation on each pixel of the first image to produce a plurality of first gradients, and performing the gradient operation on each pixel of the motion calibrated second image to produce a plurality of second gradients;
    comparing each of the first gradients and the corresponding second gradient to generate a plurality of first pixel comparison results, and generating a first parameter map according to the first pixel comparison results; and
    producing a blending image according to the first parameter map and the first image, and producing an output image at least in accordance with the blending image,
    wherein the step of comparing each of the first gradients and the corresponding second gradient to generate the first pixel comparison results, and generating the first parameter map according to the first pixel comparison results comprises:
    dividing the second gradients by the corresponding first gradients to generate a plurality of gradient comparison values; and
    generating a plurality of parameters according to the gradient comparison values, and recording the parameters as the first parameter map.

2. The image processing method as claimed in claim 1, wherein the step of producing the output image at least in accordance with the blending image comprises:
    capturing a third image with a third focal length;
    performing the geometric calibration procedure on the third image to produce the motion calibrated third image;
    performing the gradient operation on each pixel of the blending image to generate a plurality of third gradients, and performing the gradient operation on each pixel of the motion calibrated third image to generate a plurality of fourth gradients;
    comparing each of the third gradients and the corresponding fourth gradient to generate a plurality of second pixel comparison results, and generating a second parameter map according to the second pixel comparison results; and
    blending the motion calibrated third image and the blending image according to the second parameter map to produce the output image.

3. The image processing method as claimed in claim 1, wherein the step of performing the geometric calibration procedure on the second image to produce the motion calibrated second image comprises:

performing a motion amount estimation on the first image and the second image to calculate a homography matrix; and performing a geometric affine transformation on the second image according to the homography matrix, so as to obtain the motion calibrated second image.

4. The image processing method as claimed in claim 1, wherein the step of generating the parameters according to the gradient comparison values comprises:

determining whether the gradient comparison values are greater than a first gradient threshold; and setting the parameters corresponding to the gradient comparison values to a first value when the gradient comparison values are greater than the first gradient threshold.

5. The image processing method as claimed in claim 4, wherein the step of generating the parameters according to the gradient comparison values comprises:

determining whether the gradient comparison values are greater than a second gradient threshold when the gradient comparison values are not greater than the first gradient threshold;

setting the parameters corresponding to the gradient comparison values to a second value when the gradient comparison values are greater than the second gradient threshold; and setting the parameters corresponding to the gradient comparison values to a third value when the gradient comparison values are not greater than the second gradient threshold, wherein the first gradient threshold is greater than the second gradient threshold.

6. The image processing method as claimed in claim 1, wherein the step of producing the blending image according to the first parameter map and the first image comprises:

performing a blur procedure on the first image to generate a blur image; and blending the first image and the blur image according to the first parameter map to produce a main object clear image.

7. The image processing method as claimed in claim 6, wherein the step of blending the first image and the blur image according to the first parameter map to produce the main object clear image comprises:

determining whether the parameters are greater than a first blending threshold;

obtaining pixels of the blur image corresponding to the parameters to serve as pixels of the main object clear image when the parameters are greater than the first blending threshold;

determining whether the parameters are greater than a second blending threshold when the parameters are not greater than the first blending threshold;

calculating pixels of the main object clear image according to the parameters when the parameters are greater than the second blending threshold; and obtaining pixels of the first image corresponding to the parameters to serve as pixels of the main object clear image when the parameters are not greater than the second blending threshold, wherein the first blending threshold is greater than the second blending threshold.

8. The image processing method as claimed in claim 1, wherein the step of producing the blending image according to the first parameter map and the first image comprises:

calculating a plurality of sums of absolute differences corresponding to each pixel according to a pixel value of each of the pixels in the first image and the second image, and adjusting the parameters in the first parameter map according to the sums of absolute differences; and blending the first image and the motion calibrated second image according to the adjusted first parameter map to generate a full depth of field image.

9. The image processing method as claimed in claim 8, wherein the step of calculating the sums of absolute differences corresponding to each pixel according to the pixel value of each of the pixels in the first image and the second image and adjusting the parameters in the first parameter map according to the sums of absolute differences comprises:

determining a weighting factor of each of the parameters according to the sums of absolute differences when the sums of absolute differences are greater than a motion threshold, and adjusting the parameters according to the weighting factor, wherein each of the parameters decreases as the corresponding sum of absolute difference increases.

10. The image processing method as claimed in claim 8, wherein the step of blending the first image and the motion calibrated second image according to the first parameter map to generate the full depth of field image comprises:

determined whether the parameters are greater than a first blending threshold;

obtaining pixels of the motion calibrated second image corresponding to the parameters to serve as pixels of the full depth of field image when the parameters are greater than the first blending threshold;

determining whether the parameters are greater than a second blending threshold when the parameters are not greater than the first blending threshold;

calculating pixels of the full depth of field image according to the parameters when the parameters are greater than the second blending threshold; and obtaining pixels of the first image corresponding to the parameters to serve as pixels of the full depth of field image when the parameters are not greater than the second blending threshold, wherein the first blending threshold is greater than the second blending threshold.

11. An image capturing device, comprising:

an image capturing module, comprising a zoom lens and a photosensitive element, capturing a first image with a first focal length and capturing a second image with a second focal length, wherein the first focal length is focused on at least one main object; and a processor, configured to execute a plurality of modules to:

perform a geometric calibration procedure on the second image to produce the motion calibrated second image;

perform a gradient operation on each pixel of the first image to produce a plurality of first gradients, and performing the gradient operation on each pixel of the motion calibrated second image to produce a plurality of second gradients;

compare each of the first gradients and the corresponding second gradient to generate a plurality of first pixel comparison results, and generating a first parameter map according to the first pixel comparison results; and produce a blending image according to the first parameter map and the first image, and producing an output image at least in accordance with the blending image, wherein the processor is configured to execute the modules to divide the second gradients by the corresponding first gradients to generate a plurality of gradient comparison values, and generates a plurality of parameters according to the gradient comparison values, and records the parameters as the first parameter map.

12. The image capturing device as claimed in claim 11, wherein the processor is configured to execute the modules to capture a third image with a third focal length, perform the geometric calibration procedure on the third image to produce the motion calibrated third image, perform the gradient operation on each pixel of the blending image to generate a plurality of third gradients, perform the gradient operation on each pixel of the motion calibrated third image to generate a plurality of fourth gradients, compare each of the third gradients and the corresponding fourth gradient to generate a plurality of second pixel comparison results, generate a second parameter map according to the second pixel comparison results, and blend the motion calibrated third image and the blending image according to the second parameter map to produce the output image.

13. The image capturing device as claimed in claim 11, wherein the processor is configured to execute the modules to perform a blur procedure on the first image to generate a blur image, and blend the first image and the blur image according to the first parameter map to produce a main object clear image.

14. The image capturing device as claimed in claim 11, wherein the processor is configured to execute the modules to calculate a plurality of sums of absolute differences corresponding to each pixel according to a pixel value of each of the pixels in the first image and the second image, adjust the parameters in the first parameter map according to the sums of absolute differences, and blend the first image and the motion calibrated second image according to the adjusted first parameter map to generate a full depth of field image.

* * * * *